Feb. 9, 1926.　　　　　　　　　　　　　　　　　1,572,113
E. J. GOLDEN
AUXILIARY STOVE PLATE
Filed June 3, 1925
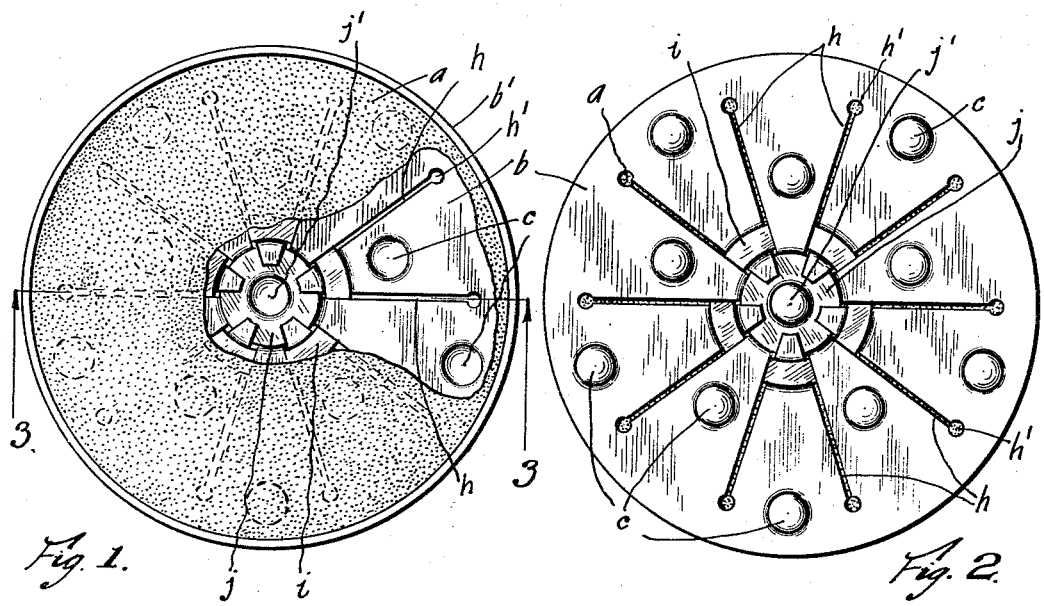
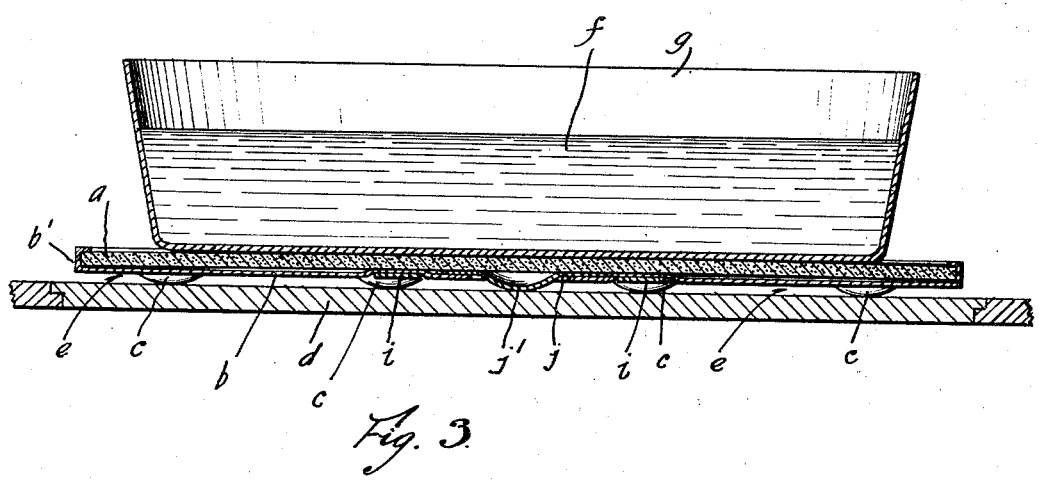
Inventor:
Eleanor J. Golden
by Herbert Ramsey
Attys.

Patented Feb. 9, 1926.

1,572,113

UNITED STATES PATENT OFFICE.

ELEANOR J. GOLDEN, OF PORTLAND, OREGON.

AUXILIARY STOVE PLATE.

Application filed June 3, 1925. Serial No. 34,724.

*To all whom it may concern:*

Be it known that I, ELEANOR J. GOLDEN, a citizen of the United States, and a resident of the city of Portland, county of Multnomah, and State of Oregon, have invented certain new and useful Improvements in Auxiliary Stove Plates, of which the following is a specification.

My invention relates to portable stove plates used on electric and gas ranges for controlling the heat applied to vessels or other utensils to be heated thereon, and is especially adapted to gas and electric ranges in which the applied heat is localized so as to be applied only to the utensil.

The object of my invention is to provide an auxiliary plate which is to be set upon a heating surface and which will have the property of dissipating a portion of the applied heat so that the same will not become severe enough to burn or scorch food or other material being heated in said utensil. When a utensil is placed directly upon the heating surface of a stove the heat applied thereto has a tendency to be distributed unevenly and thus portions of the food or other material becomes scorched; this being particularly true with milk and cereals. It is common therefore to provide double boilers in which water is arranged to act as a heat-conducting medium which does not exceed the predetermined temperature which is the steaming temperature thereof. I have discovered that if an auxiliary plate is mounted on a heating surface of said stove and said auxiliary plate is provided with raised portions and is relatively heavily insulated, the scorching of said foods is prevented. For example, I can place a pan of milk on my auxiliary plate, boil the same to a degree of evaporating a substantial volume without permitting the same to be scorched.

My auxiliary stove plate comprises a disc of heat resisting material, preferably asbestos, which is provided with a metal covering for the underside thereof, the center portion of which is divided into radial segments havings their extremities cut away so as to be spaced from each other. I provide a center ring with which said extremities are interwoven; the extremities being arranged so as to alternately overlie and underlie said ring. The metal covering is formed with a plurality of knobs on the underside arranged to support, in spaced relation, the auxiliary plate from the heating plate upon which it is set, thus providing a stratum of air which is not enclosed and thus said heated air is free to escape therefrom. Said stratum of air thus provides a medium for limiting the heat applied to the utensil carried by said auxiliary plate, so that the contents of said utensil will not be subjected to excessive heat.

The details of construction and mode of operation are hereinafter described with reference to the accompanying drawings, in which:

Fig. 1 is a plan view of my auxiliary heating plate looking at the insulated face thereof; with a portion of said insulation being shown broken away to illustrate the metal covering underneath;

Fig. 2 is a plan view of the opposite side of said auxiliary plate; and

Fig. 3 is a cross section through said plate taken on the line 3—3 of Fig. 1, and shows a heating surface supporting said auxiliary plate and a utensil carried by said plate.

My auxiliary heating plate comprises a disc of heat resisting material $a$ preferably asbestos which is of substantial thickness as shown in Fig. 1. A metal covering $b$ completely encloses the underside of said disc and extends around the edges thereof as $b'$. The metal covering is provided with knob-like projections $c$ which extend away from the disc of heat resisting material $a$ and thus form spaced leg portions for spacing the metal covering from the heating surface of the stove plate $d$. Between the adjacent faces of said stove plate and said metal covering thus is provided a stratum $e$ of air which is unenclosed and thus when heated is permitted to move out from under said heating plate and be replaced by colder air from the room. This permits the air to circulate relatively freely under said auxiliary plate to dissipate a portion of the heat to prevent an excessive amount thereof from scorching the contents $f$ in the utensil $g$ carried by said auxiliary plate. I find the greatest use for my device is boiling liquids such as milk and also in evaporating certain chemical solutions, such liquids being effected by excessive heat; said excess being prevented by the use of my auxiliary plate. The applied heat tends to warp the metal covering $b$ oftentimes and therefore I divide said metal covering by radial slits $h$ and the inner extremities therefor are relatively detached from each other. The extremities of alternate radial sections are depressed so that a ring $i$ can be placed therein on top of said depressed radial sections and the remainder of said radial sections can be placed thereover. The radial portions thus depressed to permit said ring to be placed thereover are then turned up slightly to overlie the center plate $j$.

The extremities of the remaining radial segments are turned down so that the center plate overlies them. The ring and plate thus are interwoven in such a manner with the extremities of said radial segments that they are bound relatively to each other but are permitted to move slightly in any direction by the action of the applied heat. Thus the expansion thereof does not tend to warp the plate but merely tends to cause a slight displacement of the extremities relatively to each other. The knobs $c$ are arranged so as to lie substantially on the center line of each radial segment and are preferably arranged so that the alternate knobs $c$ considered circumferentially are arranged to lie along two concentrically pitched circles so as to provide a more uniform support for said plate. The outer extremities of the radial slits $h$ which form radial segments preferably terminate in slight enlargements $h'$.

I claim:

1. An auxiliary stove plate comprising a disc of heat resisting material, a metal covering for the under side thereof, said disc and its covering being arranged to constitute an imperforate element, said metal covering being formed with a plurality of knobs on the under side arranged to support the auxiliary plate in spaced relation to the stove plate on which it is set.

2. An auxiliary stove plate comprising a disc of heat resisting material, a metal covering for the under side thereof, said metal covering being divided into semi-detached portions, thereby to accommodate the expansion and contraction of the metal, said metal covering being formed with a plurality of knobs on the under side arranged to support in spaced relation the auxiliary plate from the stove plate on which it is set.

3. An auxiliary stove plate comprising a disc of heat resisting material, a metal covering for the under side thereof, said metal covering being divided by radial slits into semi-detached portions, thereby to accommodate the expansion and retraction of the metal, said metal covering being formed with a plurality of knobs on the under side arranged to support in spaced relation the auxiliary plate from the stove plate on which it is set.

4. An auxiliary stove plate comprising a disc of heat resisting material, a metal covering for the under side thereof, the central portion of the metal covering being slitted into radial segments having their extremities cut away so as to be spaced from each other, means for holding the loose ends of said radial segments in place, said metal covering being formed with a plurality of knobs on the under side arranged to support in spaced relation the auxiliary plate from the stove plate on which it is set.

5. An auxiliary stove plate comprising a disc of heat resisting material, a metal covering for the under side thereof, said metal covering being divided into semi-detached portions, thereby to accommodate the expansion and contraction of the metal, means for holding the loose ends of said semi-detached portions in place, said metal covering being formed with a plurality of knobs on the under side arranged to support in spaced relation the auxiliary plate from the stove plate on which it is set.

6. An auxiliary stove plate comprising a disc of heat resisting material, a metal covering for the under side thereof, the central portion of the metal covering being slitted into radial segments having their extremities cut away so as to be spaced from each other, a ring with which said extremities are interwoven by so arranging the latter as to overlie and underlie alternately said ring, said metal covering being formed with a plurality of knobs on the under side arranged to support in spaced relation the auxiliary plate from the stove plate on which it is set.

ELEANOR J. GOLDEN.